US012475092B2

(12) United States Patent
Jagasia et al.

(10) Patent No.: US 12,475,092 B2
(45) Date of Patent: Nov. 18, 2025

(54) SYSTEMS AND METHODS FOR LINEAGE-AWARE DATA RETENTION

(71) Applicant: Palantir Technologies Inc., Denver, CO (US)

(72) Inventors: Arnav Jagasia, New York, NY (US); Ashley Meuser, Arlington, VA (US); Mihir Patil, New York, NY (US); Pieris Christofi, London (GB); Sam Stoll, London (GB)

(73) Assignee: Palantir Technologies Inc., Denver, CO (US)

( * ) Notice: Subject to any disclaimer, the term of this patent is extended or adjusted under 35 U.S.C. 154(b) by 0 days.

(21) Appl. No.: 18/218,764

(22) Filed: Jul. 6, 2023

(65) Prior Publication Data

US 2024/0012797 A1 Jan. 11, 2024

Related U.S. Application Data

(60) Provisional application No. 63/431,913, filed on Dec. 12, 2022, provisional application No. 63/359,044, filed on Jul. 7, 2022.

(51) Int. Cl.
*G06F 16/00* (2019.01)
*G06F 16/185* (2019.01)
*G06F 16/21* (2019.01)
*G06F 16/23* (2019.01)

(52) U.S. Cl.
CPC .......... *G06F 16/219* (2019.01); *G06F 16/185* (2019.01); *G06F 16/2358* (2019.01); *G06F 16/2379* (2019.01)

(58) Field of Classification Search
None
See application file for complete search history.

(56) References Cited

U.S. PATENT DOCUMENTS

| 10,503,700 | B1   | 12/2019 | Sanvido |               |
|------------|------|---------|---------|---------------|
| 10,540,095 | B1   | 1/2020  | Cheng et al. |          |
| 10,592,353 | B2 * | 3/2020  | Martin  | G06F 11/1451  |
| 10,860,550 | B1 * | 12/2020 | Chheda  | G06F 16/213   |
| 11,340,800 | B1   | 5/2022  | Sanvido |               |
| 11,748,212 | B1 * | 9/2023  | Holenstein | G06F 11/1448 |
|            |      |         |         | 714/19        |
| 11,921,670 | B1 * | 3/2024  | Emberson | G06F 16/125  |
| 2016/0070589 | A1 * | 3/2016 | Vermeulen | G06F 9/466  |
|            |      |         |         | 711/153       |
| 2016/0070726 | A1 * | 3/2016 | Macnicol | G06F 11/0745 |
|            |      |         |         | 707/691       |

(Continued)

*Primary Examiner* — Farhan M Syed
(74) *Attorney, Agent, or Firm* — Faegre Drinker Biddle &

(57) ABSTRACT

Systems and methods for lineage-aware data retention are provided. An example method includes receiving information of a committed transaction. The committed transaction is configured to add or change data to a dataset. The example method further includes receiving one or more lineages for the committed transaction, determining one or more parent transactions based at least in part on the one or more lineages, obtaining one or more parent retention dates that correspond to the one or more parent transactions respectively, and determining a transaction retention date for the committed transaction based at least in part on the one or more parent retention dates.

20 Claims, 17 Drawing Sheets

(56) References Cited

U.S. PATENT DOCUMENTS

| | | | |
|---|---|---|---|
| 2016/0070740 A1* | 3/2016 | Vermeulen | G06F 16/273 |
| | | | 707/703 |
| 2016/0098323 A1* | 4/2016 | Mutha | G06F 16/122 |
| | | | 707/654 |
| 2016/0352830 A1 | 12/2016 | Borowiec et al. | |
| 2016/0352834 A1 | 12/2016 | Borowiec et al. | |
| 2017/0011085 A1* | 1/2017 | Douros | G06F 16/275 |
| 2017/0171246 A1 | 6/2017 | Arumugam et al. | |
| 2018/0373604 A1* | 12/2018 | Martin | G06F 11/1451 |
| 2019/0114335 A1* | 4/2019 | Koenig | G06F 16/24532 |
| 2020/0183912 A1* | 6/2020 | Raju | G06F 16/122 |
| 2021/0109907 A1* | 4/2021 | Chheda | G06F 16/2379 |
| 2021/0350010 A1* | 11/2021 | Schvey | H04L 63/04 |
| 2022/0121523 A1* | 4/2022 | Upadhyay | G06F 11/1448 |
| 2022/0392590 A1* | 12/2022 | Winstrom | G16H 80/00 |
| 2023/0020330 A1* | 1/2023 | Schwerin | G06F 16/256 |
| 2023/0306000 A1* | 9/2023 | Greehy | G06F 16/176 |

\* cited by examiner

FIG. 8

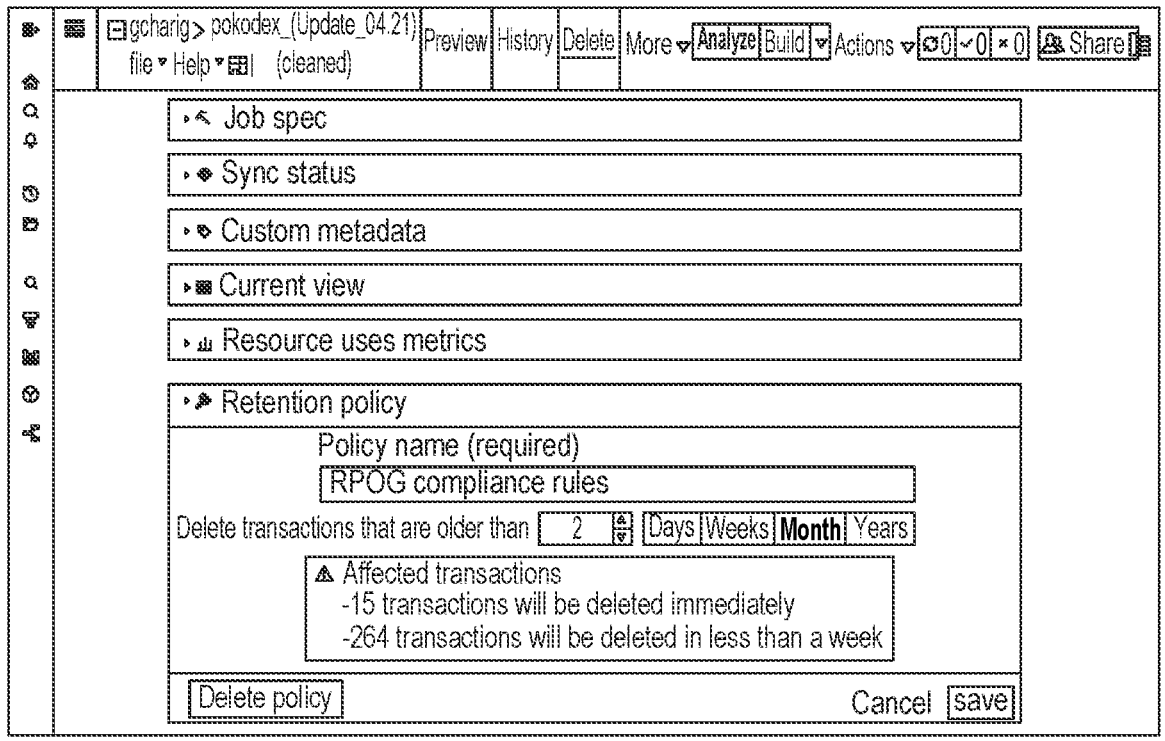
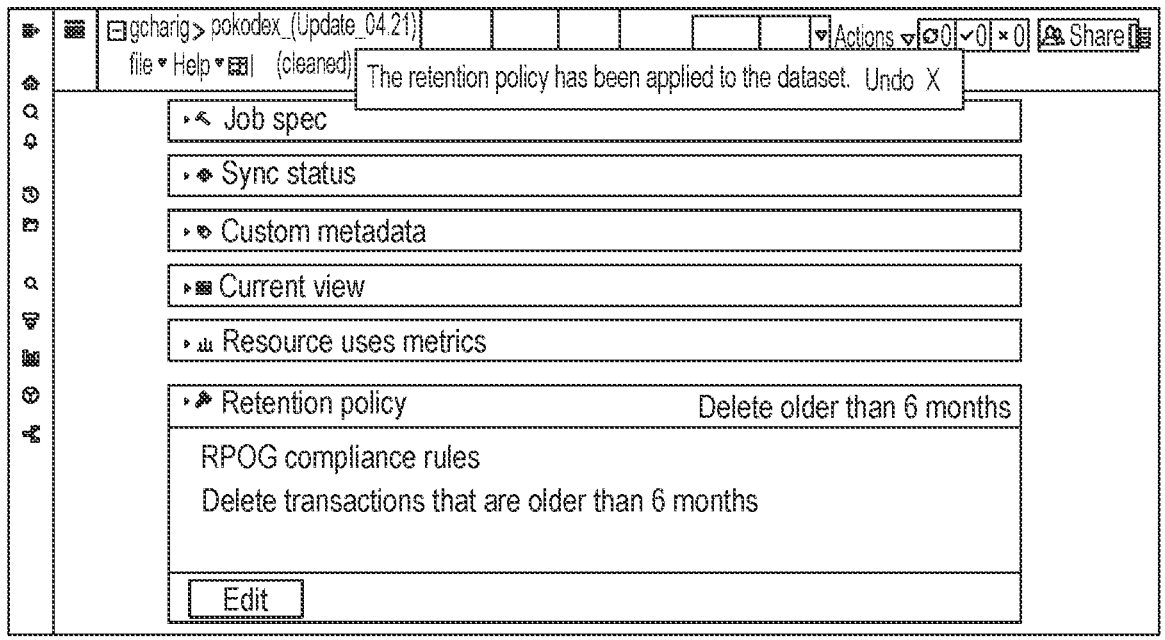
FIG. 9

1. GET | set<policy> getPoliciesForResource(ResourceIdentifier compassRid)

2. POST | PolicyIdentifier addPolicyToResource(ResourceIdentifier compassRid, Policy newPolicy)

3. PUT | RemoveResponse removePolicyFromResource (ResourceIdentifier compassRid, PolicyIdentifier policyId)

4. PUT | EditResponse editPolicy (PolicyIdentifier policyId, Policy editedPolicy)

5. DELETE | DeleteResponse deletePolicy (PolicyIdentifier PolicyId)

6. GET | DeletionDate evaluatePolicyForTransaction (ResourceIdentifier transactionRid)

FIG. 12

Endpoints

1. GET | List<DatasetAndTransactionRid> getTransactionToDelete(SafeLong deletionDate)

2. GET | SafeLong getDeletionDateForTransaction (ResourceIdentifier transactionRid)

FIG. 13

SYSTEMS AND METHODS FOR LINEAGE-AWARE DATA RETENTION

1. CROSS REFERENCE TO RELATED APPLICATIONS

This application claims priority to U.S. Provisional Application No. 63/359,044 filed on Jul. 7, 2022 and 63/431,913 filed on Dec. 12, 2022, both entitled "SYSTEMS AND METHODS FOR LINEAGE-AWARE DATA RETENTION," both of which are incorporated by reference herein for all purposes in their entirety.

2. TECHNICAL FIELD

Certain embodiments of the present disclosure are directed to computing platforms with information governance policies. More particularly, some embodiments of the present disclosure provide systems and methods for lineage-aware data retention.

3. BACKGROUND

Information governance policies may require data deletions for compliance purposes. For example, specific data in a specific dataset may need to be deleted. Further, the specific data may need to be deleted through downstream children as well, such as child datasets of the specific dataset.

Hence it is desirable to improve the techniques for data retention and deletion along dataset lineages.

4. SUMMARY

Certain embodiments of the present disclosure are directed to computing platforms with information governance policies. More particularly, some embodiments of the present disclosure provide systems and methods for lineage-aware data retention.

In some embodiments, an example method for lineage-aware data retention is provided. The example method includes receiving information of a committed transaction. The committed transaction is configured to add or change data to a dataset. The example method further includes receiving one or more lineages for the committed transaction, determining one or more parent transactions based at least in part on the one or more lineages, obtaining one or more parent retention dates that correspond to the one or more parent transactions respectively, and determining a transaction retention date for the committed transaction based at least in part on the one or more parent retention dates. in certain embodiments, the example method is implemented by one or more processors.

In some embodiments a system is provided. The system includes at least one processor and memory storing instructions that, when executed by the at least one processor cause the system to perform a set of operations. The set of operations include receiving information of a committed transaction. The committed transaction is configured to add or change data to a dataset. The set of operations further includes receiving one or more lineages for the committed transaction, determining one or more parent transactions based at least in part on the one or more lineages, obtaining one or more parent retention dates that correspond to the one or more parent transactions respectively, and determining a transaction retention date for the committed transaction based at least in part on the one or more parent retention dates.

In some embodiments, a method for lineage-aware data retention is provided. The method includes: receiving information of a plurality of committed transactions. Each committed transaction of the plurality of committed transactions is configured to add or change data to a dataset. The method further includes receiving one or more lineages for each committed transaction of the plurality of committed transactions; determining a plurality of parent transactions based at least in part on the one or more lineages for each committed transaction of the plurality of committed transactions; obtaining one or more parent retention dates corresponding to each parent transaction of the plurality of parent transactions; determining a transaction retention date for each committed transaction of the plurality of committed transactions based at least in part on the one or more parent retention dates; receiving an override policy for data retention for a subset of parent transactions from the plurality of parent transactions; and updating the transaction retention date for a subset of committed transactions from the plurality of committed transactions based on the override policy. The subset of committed transactions correspond to the subset of parent transactions. The method is implemented by one or more processors.

This summary is provided to introduce a selection of concepts in a simplified form that are further described below in the Detailed Description. This summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTION OF THE DRAWINGS

The foregoing aspects and many of the intended advantages of this invention will become more readily appreciated as the same becomes better understood by reference to the following detailed description when taken in conjunction with the accompanying drawings.

FIG. 8 illustrates an example user interface for setting or updating a retention policy, according to some aspects described herein.

FIG. 9 illustrates an example user interface for editing a retention policy, according to some aspects described herein.

FIG. 12 illustrates an example of one or more endpoints for a retention policy service, according to some aspects described herein.

FIG. 13 illustrates an example of one or more endpoints for a retention enforcement service, according to some aspects described herein.

Figure 1:
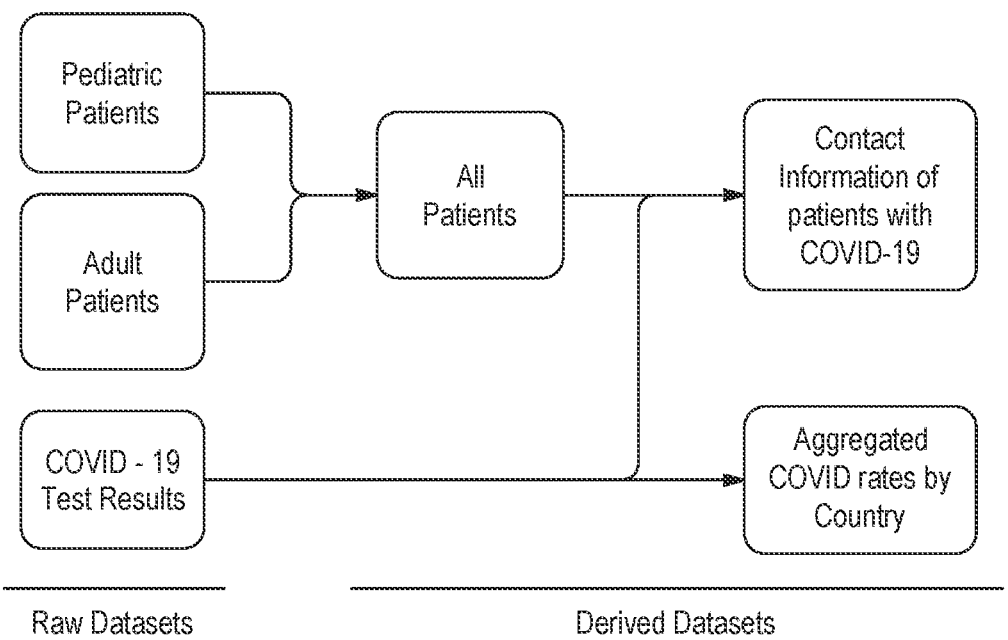
FIG. 1 illustrates an example data flow, according to some aspects described herein.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplification set out herein illustrates an embodiment of the invention, and such an exemplification is not to be construed as limiting the scope of the invention in any manner.

6. DETAILED DESCRIPTION OF THE DRAWINGS

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g., 1 to 5 includes 1, 1.5, 2, 2.75, 3, 3.80, 4, and 5) and any range within that range.

Although illustrative methods may be represented by one or more drawings (e.g., flow diagrams, communication flows, etc.), the drawings should not be interpreted as implying any requirement of, or particular order among or between, various steps disclosed herein. However, some embodiments may require certain steps and/or certain orders between certain steps, as may be explicitly described herein and/or as may be understood from the nature of the steps themselves (e.g., the performance of some steps may depend on the outcome of a previous step). Additionally, a "set," "subset," or "group" of items (e.g., inputs, algorithms, data values, etc.) may include one or more items and, similarly, a subset or subgroup of items may include one or more items. A "plurality" means more than one.

As used herein, the term "based on" is not meant to be restrictive, but rather indicates that a determination, identification, prediction, calculation, and/or the like, is performed by using, at least, the term following "based on" as an input. For example, predicting an outcome based on a particular piece of information may additionally, or alternatively, base the same determination on another piece of information. As used herein, the term "receive" or "receiving" means obtaining from a data repository (e.g., database), from another system or service, from another software, or from another software component in a same software. In certain embodiments, the term "access" or "accessing" means retrieving data or information, and/or generating data or information.

Conventional systems and methods are often unable to effectively and/or efficiently implement personal data deletion policies in large-scale data systems. For example, implementing (e.g., respecting) personal data deletion policies in large-scale data systems can be complex and cumbersome for conventional system and methods. However, privacy legislation, such as the GDPR ("General Data Protection Regulation") and CCPA ("California Consumer Privacy Act"), highlight the importance of deleting data. In large-scale data systems, raw data tends to quickly proliferate in original or derivative formats, but nonetheless is required to respect a deletion period according to the purposes of collection. For conventional systems and methods, with each transformation, potentially involving the combination with other data, deletion periods become more difficult to reason about and account for. Accordingly, there exists a need for lineage-aware data retention to efficiently implement deletion policies, such as in large-scale data systems.

Various embodiments of the present disclosure can achieve benefits and/or improvements by a computing system implementing lineage-aware data retention. In some embodiments, benefits of techniques provided herein include efficiency and/or improved user-engagement, such as by not having to re-compute large scale datasets in a platform for a small deletion in a source dataset. In some embodiments, benefits include determining which transactions are going to be deleted when and/or being able to answer prompts regarding such determinations. In some embodiments, benefits include generating an overview of which transactions are going to be deleted. Other benefits that may be recognized by those of ordinary skill in the art, at least in light of teachings provided herein.

According to some embodiments, a deletion solution (e.g., a successful deletion salutation) should find every instance of sensitive data across multiple transformations and combinations of the data. In some embodiments, a deletion solution is a lineage-aware deletion. In certain embodiments, the lineage of a piece of data describes what other data was used to create that data.

As an example illustrated in FIG. 1, as data flows through the platform in this hypothetical example, parent-child relationships are produced between datasets. FIG. 1 is merely an example. One of ordinary skill in the art would recognize many variations, alternatives, and modifications. For example, the Pediatric Patients dataset and the Adult Patients dataset are parent datasets of the All Patients dataset, which is in turn a child dataset of both the Pediatric Patients dataset and the Adult Patients dataset. In some embodiments, the datasets include raw datasets and derived datasets. For example, the datasets shown in gray are called raw datasets, and the datasets in orange are derived datasets.

According to certain embodiments, a raw dataset is (e.g., simply is) one that has no parent dataset within the platform (e.g., in-degree of zero), while a derived dataset is one that has at least one parent dataset within the platform (e.g., in-degree greater than zero). In some embodiments, as data moves through the platform, a data management software keeps track of these parent-child relationships between datasets, which allows the whole platform to be lineage-aware. As an example, this is the building block (e.g., fundamental building block) that will allow a user to ensure that when it's time for COVID 19 Test Results dataset to be deleted, the data management system (e.g., a data retention/deletion system) also deletes Contact Information of Patients with COVID-19 dataset, and optionally (e.g., if wanted), Aggregated COVID rates by County dataset as well.

In the example illustrated in FIG. 1, COVID 19 Test Results dataset isn't simply a static dataset. FIG. 1 is merely an example. One of ordinary skill in the art would recognize many variations, alternatives, and modifications. In some embodiments (e.g., in reality), COVID 19 Test Results dataset would be a dynamic dataset, with new data coming at a regular cadence. For example, as more tests are performed, more and more data is held. In some examples, it may or may not be necessary to store the individual granular data from testing events that happened months ago. In certain examples, is it sufficient to continue to persist the aggregated statistics, for example, in Aggregated COVID rates by County dataset. In some embodiments, in the context of privacy protection, the latter (e.g., the aggregated statistics) is far preferable, without compromising the use case.

Figure 2:
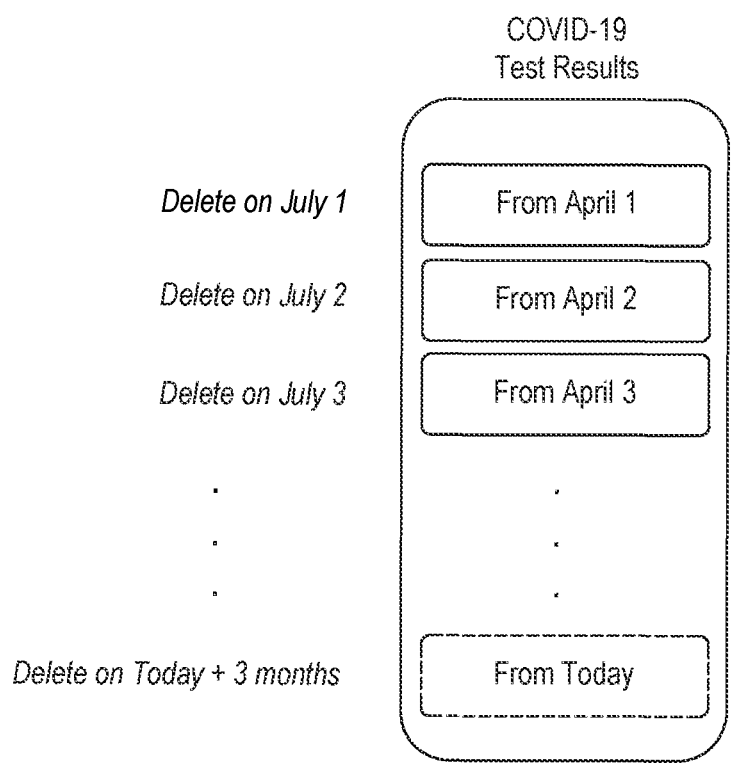
FIG. 2 illustrates an example data management system, according to some aspects described herein.

According the certain embodiments, doing this, however, requires more granular deletion, for example, the data management system (e.g., a data retention/deletion system) does not delete all of COVID-19 Test Results dataset. In some embodiments, every chunk of data that comes in, also referred to as a transaction, needs to be on a separate deletion schedule, depending on when it came in. For example, it may be desirable to keep the actual COVID-19 related data for 3 months after it came in—after that point, it's not necessary to hold the data for that long, as it is only really relevant for a little while after the test was administered. In some examples, the data management system intends to give each transaction of data a time to live (TTL), for example, TTL of 3 months. As illustrated in FIG. 2, the data management system (e.g., a data retention/deletion system) may set the one or more deletion dates for one or more transactions of test result data that come in each date starting April 1—with a 3 month TTL, such that the data is expected to be deleted starting July 1, one day at a time. FIG. 2 is merely an example. One of ordinary skill in the art would recognize many variations, alternatives, and modifications.

Figure 3:
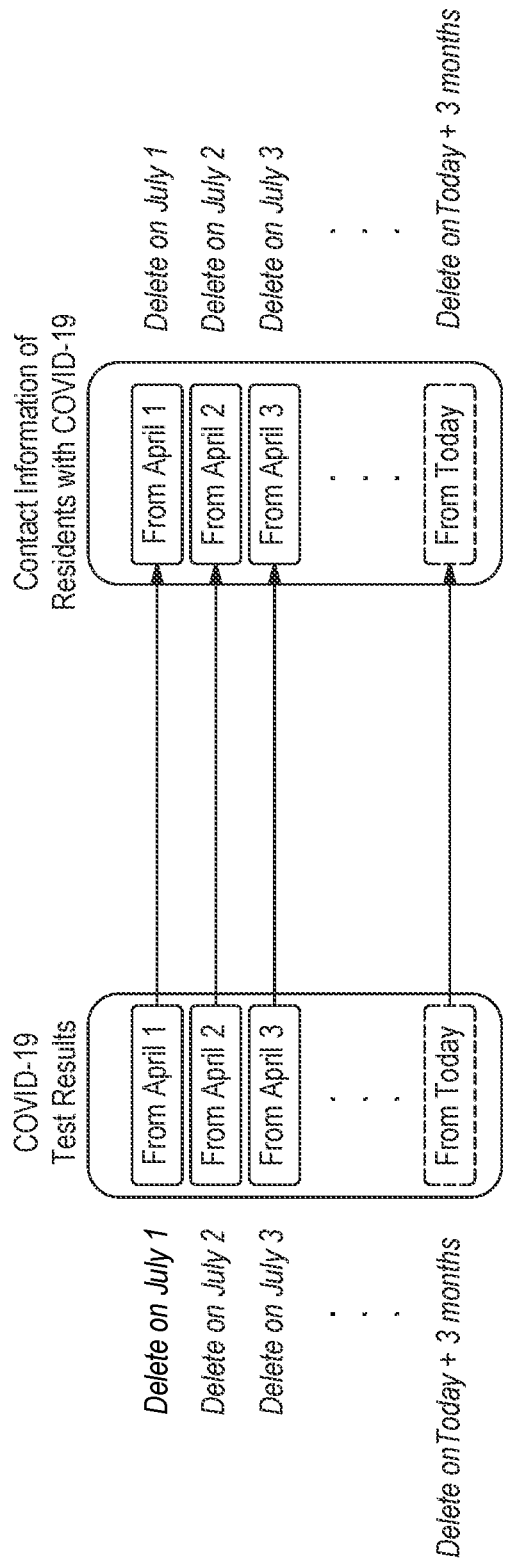
FIG. 3 illustrates an example of deletion dates extending to descendant datasets, according to some aspects described herein.

According to some embodiments, this granular level deletion allows the system to preserve the useful parts of the data, without keeping data that are no longer needed. In certain embodiments, the deletion dates also extend to descendant datasets (e.g. child datasets). For example, the deletion dates of COVID-19 Test Result dataset extend to contact information of patients with COVID-19 dataset, as shown in FIG. 3. FIG. 3 is merely an example. One of ordinary skill in the art would recognize many variations, alternatives, and modifications. In some embodiments, the descendant transactions of data in the descendant dataset also are subject to the same deletion requirement as their parent. In certain embodiments, this sort of highly granular deletion is supported in a data management platform, as the platform tracks the lineage of each of the one or more transactions within a dataset.

According to certain embodiments, a data management system (e.g., a data retention/deletion system) may use one or more data deletion principles (e.g., data deletion system principles). In some embodiments, a working deletion solution needs to adhere to certain key principles if it is to be successful in a data platform. In certain embodiments, the data deletion principles include the principle of correctness, for example, all data scheduled for deletion should be deleted at the appropriate time, and data not scheduled for deletion shouldn't be deleted. In some embodiments, the data deletion principles include the principle of transparency, for example, legibility regarding when data is going to be deleted and why it is going to be deleted. In certain embodiments, the data deletion principles include the principle of verifiability, for example, confirmation that data was successfully deleted, including capturing the reasons/a trail of why it was deleted. In some embodiments, the data deletion principles include the principle of efficiency, for example, a system will not be re-computing large-scale datasets in the platform for a small deletion in a source dataset.

According to some embodiments, the data management system (e.g., a data retention/deletion system) explores the ideas of lineage-awareness and granularity. In certain embodiments, in the deletion solution in a data management system, lineage-awareness and granularity are both important facets that are explored further below.

Figure 4:
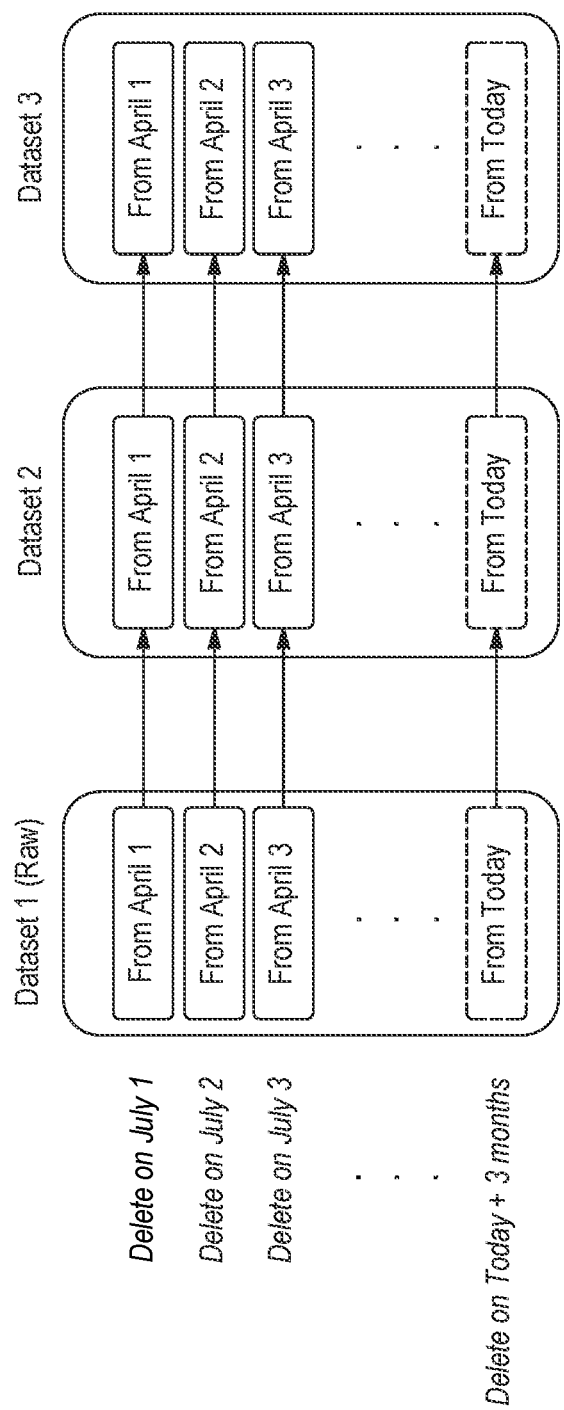
FIG. 4 illustrates an example data management system that places deletion dates on parent transactions and not child transaction, according to some aspects described herein.

According to certain embodiments, the data management system (e.g., a data retention/deletion system) is configured to conduct lineage-aware deletions by requiring (e.g., only requiring) a deletion date on one or more raw datasets. In some embodiments, this allows the system to traverse the lineage graph to identify datasets to be deleted. In certain embodiments, this represents a simple and elegant recursive solution. In the example illustrated in FIG. 4, the data management system places one or more deletion dates on the one or more raw ancestor transactions (e.g., parent transactions), and not on the descendant transactions (e.g., child transactions). FIG. 4 is merely an example. One of ordinary skill in the art would recognize many variations, alternatives, and modifications. In some embodiments, on the day of deletion, the lineage arrow(s) would be traversed recursively, and a full set of resources to delete would be derived. For example, on July 1, the data management/deletion system is configured to delete the April 1 transaction from Dataset 1, and then the system traverses the one or more lineage arrows to delete the April 1 transactions from Datasets 2 and 3. As an example, these 3 transactions, in this case, would be the deletion graph that is submitted for deletion.

According to some embodiments, between the time that the data management system (e.g., a data retention/deletion system) derives the deletion graph and the time the system executes the deletion, a new piece of data could be created, which would not be deleted with the data represented in the deletion graph. In certain embodiments, the system may lock down all the data such that no new data could be created from it. In some embodiments, the data management system (e.g., a data retention/deletion system) needs to have transparency of deletion. For example, in order to find out what will be deleted in the next N days, the system may traverse the entire data graph starting from every raw dataset that has a deletion date. In certain examples, this can be expensive in computing resources.

Figure 5:
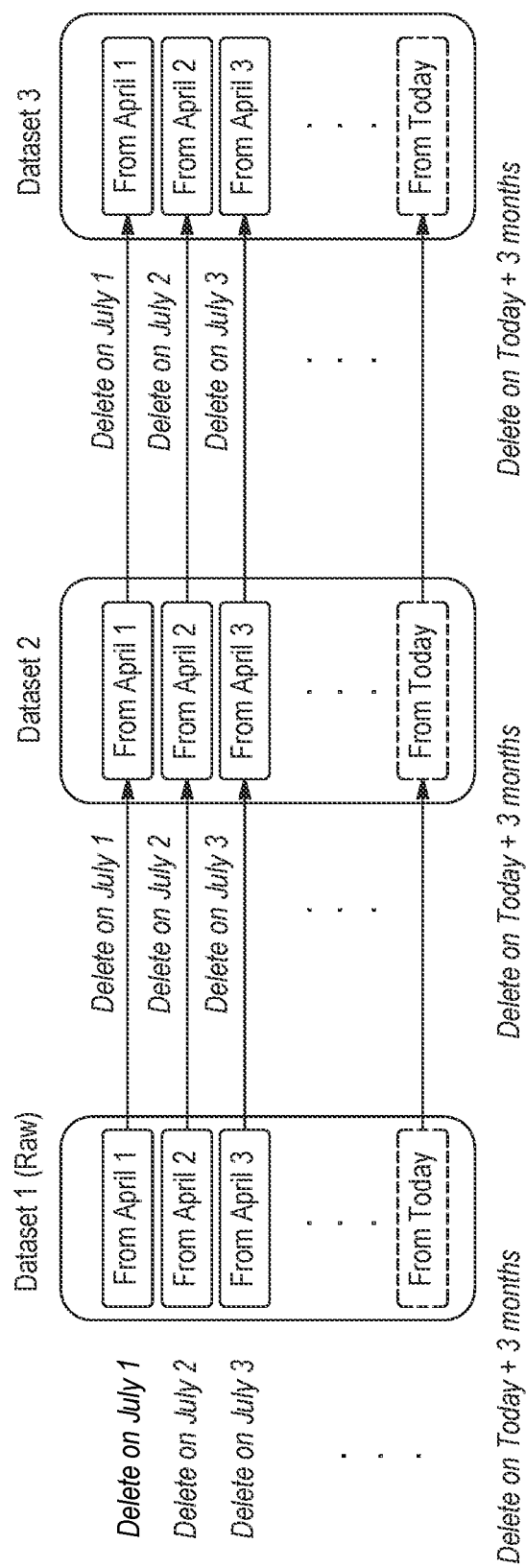
FIG. 5 illustrates an example of a declarative design of a deletion policy, according to some aspects described herein.
Figure 6:
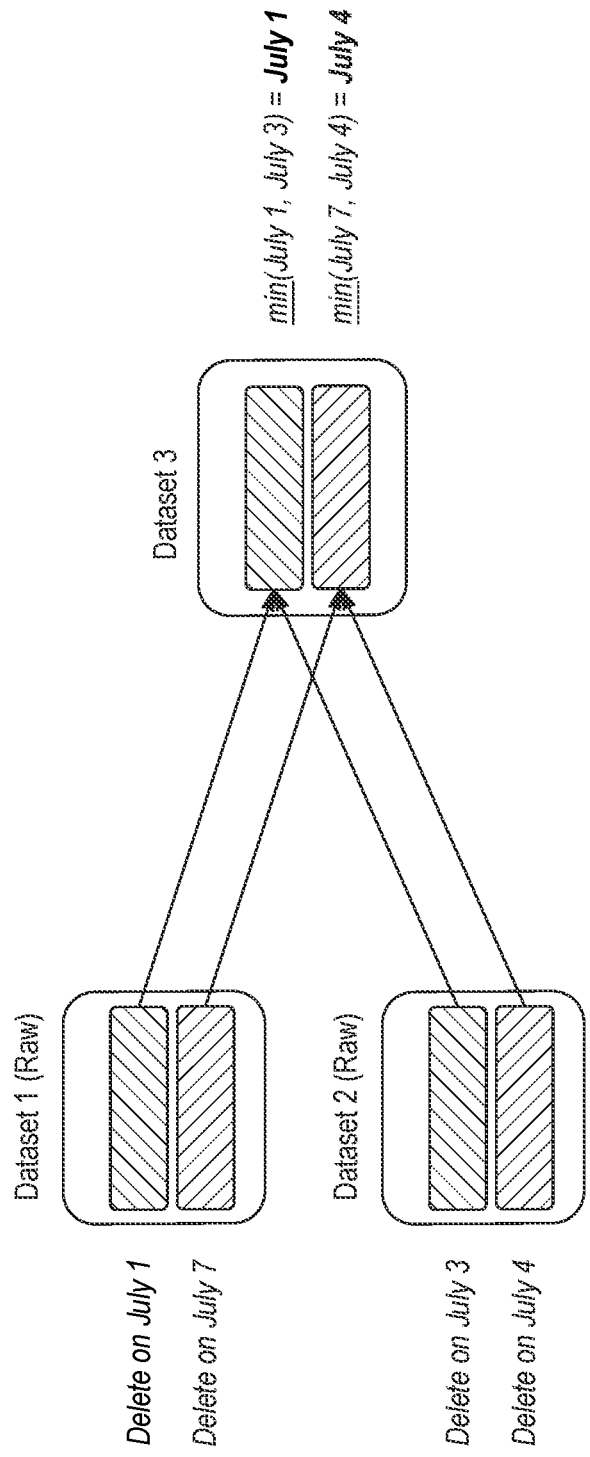
FIG. 6 illustrates an example of a use of an operator to take an earliest deletion date from a plurality of deletion dates, according to some aspects described herein.

According to certain embodiments, the data management system (e.g., a data retention/deletion system) uses a declarative design with deletion policies, where every transaction has its own deletion date through a deletion policy. FIG. 5 illustrates an example of a declarative design of a deletion policy. FIG. 5 is merely an example. One of ordinary skill in the art would recognize many variations, alternatives, and modifications. In some embodiments, when a deletion policy is applied to a transaction on an ancestor dataset, the data management system (e.g., a data retention/deletion system) triggers a background asynchronous job that eventually updates the deletion dates of all of its descendant transactions. In certain embodiments, when an ancestor transaction deletion date is updated, the data management system triggers a background asynchronous job that updates the deletion dates of all of its descendant transactions. In some embodiments, when a new descendant transaction is committed (e.g. derived from the data of parent transaction(s) and made accessible), that new transaction needs to adopt the minimum deletion date of its parent transactions. FIG. 6 is an illustrative example of a use of an operator to take an earliest deletion date from a plurality of deletion dates. In some examples, the operator may be a "min" or minimum value operation that takes the earliest deletion date, to remain compliant. FIG. 6 is merely an example. One of ordinary skill in the art would recognize many variations, alternatives, and modifications.

According to some embodiments, the bookkeeping done by the data management system (e.g., a data retention/deletion system) is cumbersome to sequence and perform, but is not without reward. In certain embodiments, there are potential problems with the recursive design, for example, the lack of correctness and transparency. In some embodiments, instead of building out a deletion graph as in the recursive design (e.g., case), every transaction has its own deletion date. In certain embodiments, this allows us to know, efficiently, what transactions are going to be deleted when, which in turn allows the system to answer the question, for example, "What is going to be deleted in the next N days". In some embodiments, the granular design gives stronger correctness guarantees, as the data management system (e.g., a data retention/deletion system) only deletes data that is proactively applied a deletion date onto, rather than building the deletion graph at deletion time.

According to certain embodiments, the data management system (e.g., a data retention/deletion system) may use one or more deletion policies. In some embodiments, as the system knows how deletion dates flow through the data management system via lineage, the system knows how those deletion dates came to be in the first place. In certain embodiments, this is done by a deletion policy (e.g., a primitive in the platform). In some embodiments, deletion policies are applied at the dataset level (not the transaction level), and describe a paradigm for assigning deletion dates. In some embodiments, deletion policies are applied at the transaction level. In certain embodiments, there are 2 types of policies: time-to-live (TTL) policy, which, if applied on a dataset, every transaction in that dataset must be deleted some fixed amount of time after that transaction was created; and fixed-deletion-date policy, which, if applied on a dataset, all transactions will be deleted on a fixed date specified in the policies. In some embodiments, a policy can be applied on any dataset, but generally are most useful on one or more raw datasets. In certain embodiments, if a policy is applied to a descendant dataset that has ancestors with separate policies (e.g., different policies), the minimum deletion date is evaluated for each transaction in that descendant dataset.

Figure 7:
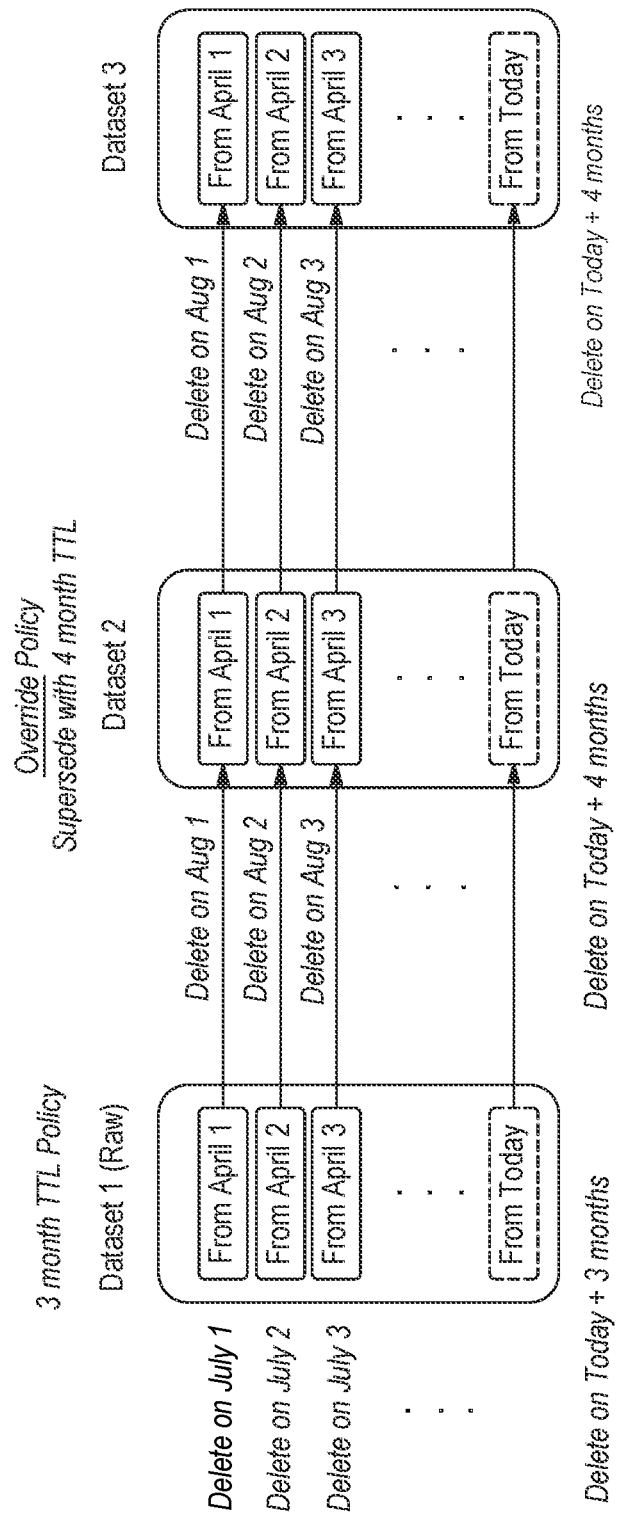
FIG. 7 illustrates an example of one or more override policies, according to some aspects described herein.

According to some embodiments, the data management system (e.g., a data retention/deletion system) includes features of override policies. In certain embodiments, users that have certain elevated permissions can set override policies on one or more descendant datasets. In some embodiments, an override policy is a policy that essentially severs the influence of all ancestor deletion policies on the transactions of that dataset. In certain embodiments, like with any policy, once an override policy is applied on a dataset, all descendants of that dataset are also impacted by it. In some embodiments, an override policy can also be specified with an optional superseding policy—a new policy to subject the downstream dataset to. FIG. 7 illustrates an example of one or more override policies. FIG. 7 is merely an example. One of ordinary skill in the art would recognize many variations, alternatives, and modifications.

According to certain embodiments, information governance policies may require data deletion for compliance purposes. In some embodiments, to delete the actual substance of the data, rather than a dataset (potentially made up by several transactions) or project (potentially made up by several datasets), a data management system (e.g., a data retention/deletion system) uses lineage-aware deletions. As an example, for compliance purposes, specific data in a specific dataset needs to be deleted, and it needs to be deleted through all downstream children (e.g., child datasets, descendant datasets) as well. In certain embodiments, some examples of deletion compliance policies include: fixed-deletion-date policy, for example, all new transactions will be deleted at a pre-specified time T; and time-to-live policy, for example, all new transactions will be deleted N days after they are created. In some embodiments, deletion policies can be augmented with the information for downstream exemptions, such that all new transactions on an exempted dataset will have no deletion date. For example, a policy is explicitly designed to exempt a specific dataset and its transactions from deletion requirements upstream.

According to some embodiments, exemptions are represented by one or more features (e.g., dataset features, dataset features of datasets that are not governed by a policy) of a policy. In specific embodiments, an exemption includes a list of datasets or transactions to which a particular policy should not be applied. In some embodiments, other policies may still apply to data sets that are exempted from particular policies, as exemptions may be specified within a policy. According to some embodiments, overrides are policies that are applied on a dataset or transaction. In some embodiments, overrides sever one or more (e.g., all) upstream policies and replace them with a new policy. In some embodiments, overrides sever one or more (e.g., all) upstream policies and replace them with no policy.

According to some embodiments, there are specific transactions within a dataset that need to be deleted immediately, along with all of those transactions' downstream descendant transactions. In certain embodiments, for cases like these, it's important that the data management system (e.g., data management platform) allows the retention dates (also referred to as deletion dates) for specific transactions to be overridden by one or more users with appropriate privileges. In some embodiments, this edit will supersede all dataset-level retention policies for that transaction. In certain embodiments, some datasets are transformed such that they may be deemed sufficiently safe and no longer require as a strict retention date. For example, some datasets might only have de-identified or aggregated data. In some embodiments, to account for this, the data management system (e.g., a data management framework) also supports the concept of overriding a retention policy.

In certain embodiments, the data management system, for example, via a retention policy service, will validate a user's permissions before the user can override a retention policy on a transaction or a dataset. In some embodiments, the data management system (e.g., the deletion framework) will immediately evaluate the retention policies (i.e. whenever the transaction is created, or a policy is modified). In certain embodiments, this is because one of the key requirements of deletion solutions is legibility and audit-ability; when the data management system (e.g. the deletion framework) proactively evaluates retention policies, this gives the data management system the ability to easily answer the question "what data will be deleted in the next N days". In some embodiments, there are two options for when the data management system can evaluate a retention policy on a transaction: 1) a "lazy" approach, to evaluate the policy during a deletion job; and 2) an "immediate" approach, to evaluate the policy whenever the transaction is created, or a policy is modified. In certain embodiments, the lazy approach has the advantage of requiring much less space and allows for easy updating of retention policies. In some embodiments, the immediate approach requires the system to write a retention date for every transaction (more space), but allows the system to know in constant time when a particular resource will be deleted.

According to some embodiments, the data management system (e.g., a data retention/deletion system) stores and propagates one or more retention dates and policies. In certain embodiments, to facilitate lineage-aware data deletion service, one or more transactions are assigned to and/or associated with their retention dates at creation (e.g., immediately at creation). In certain embodiments, when a transaction is committed, the data management system, for example, via the deletion service, will listen for the transaction commit event and an entry will be populated for the new transaction.

In some examples, the data management system uses two data structures (e.g., two tables) to facilitate storing and propagating one or more retention dates and policies and track lineage. For example, the first data structure (e.g., a first database table) includes Compass Resource ID and Policy RID; and the second data structure (e.g., a second database table) includes Policy RID and Policy Object. In some examples, in the first data structure, only Compass Resource IDs that have an explicit policy (e.g., a non-inherited policy) will be recorded. In certain examples, other deletion information (e.g., a transaction retention data object, a transaction retention record, etc.) that will be stored as a transaction deletion schedule that is a part of the data deletion service, including 1) Scheduled Deletion Date for the Transaction; 2) Policy IDs (and versions) that contributed to the aforementioned Deletion Date; 3) Whether or not this transaction should ever inherit its upstream retention date; and 4) An enumerator that describes how the retention date was derived including: a. POLICY_ON_DATASET, which indicates that the retention date was derived from the Policy IDs that were explicitly assigned to this dataset by a user; b. UPSTREAM_TRANSACTION, which indicates that the current transactions's deletion date was derived from an upstream transaction, and that was propagated down to this transaction; and c. OVERRIDDEN_HERE, which indicates that the retention date was specifically overridden for this transaction.

Figure 8:
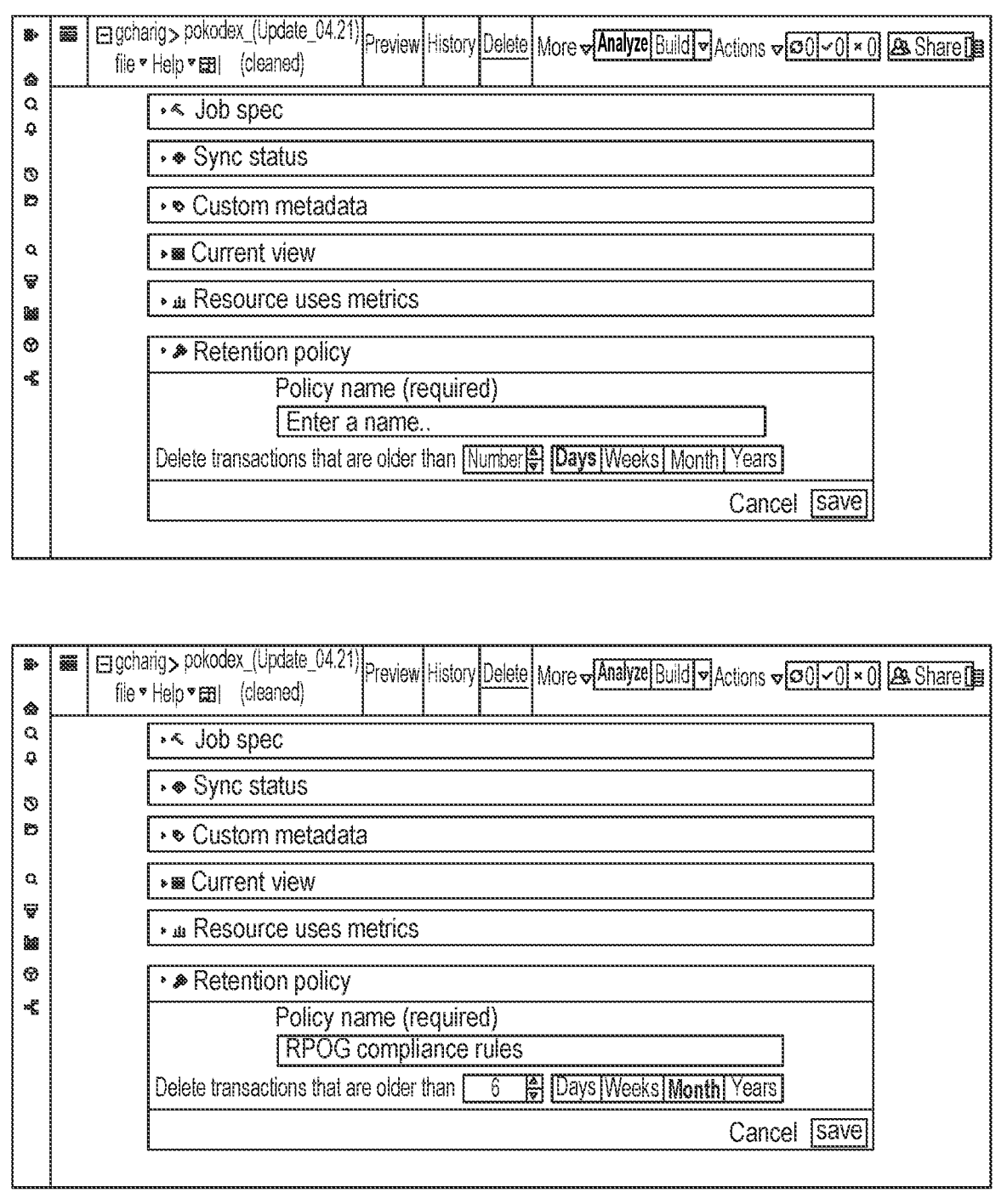
Figure 10:
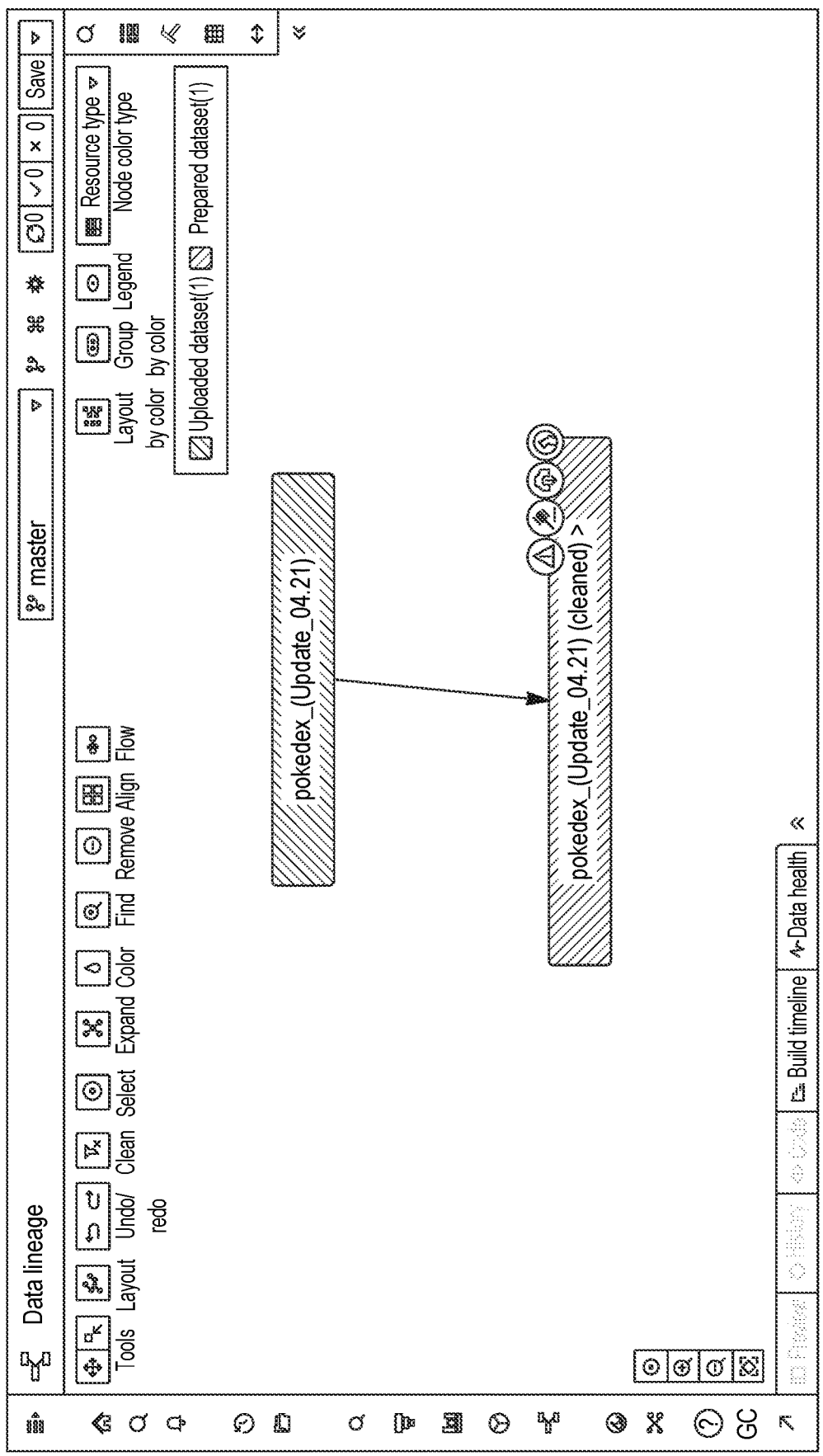
FIG. 10 illustrates an example user interface flagging existing of retention policies, according to some aspects described herein.
Figure 11:
FIG. 11 illustrates an example user interface, according to some aspects described herein.

According to certain embodiments, the data management system (e.g., a data retention/deletion system) performs execution of deletion. In some embodiments, the data management system (e.g., the data management framework), including the data deletion service, handles storing and propagating retention dates and policies. In certain embodiments, the data management system and/or the data deletion service periodically scans the deletion dates of transactions and marks the ones that need to be deleted. In certain examples, there is no provenance. In some examples, the system assigns and updates retention data, for example, based on an awareness of existing graph lineages, such that when it comes time to actually delete the data, no further traversal of any graphs is necessary. In certain embodiments, this service accepts the one or more retention dates that correspond to each transaction at face value. FIG. 8 is an example user interface for setting or updating a retention policy. FIG. 9 is an example user interface for editing a retention policy. FIG. 10 is an example possibly flagging existence of retention policies in other software applications (e.g., data lineage). These figures are merely examples. One of ordinary skill in the art would recognize many variations, alternatives, and modifications.

According to some embodiments, data received by the data management system (e.g., data management platform) has certain retention requirements set by the data provider. In certain embodiments, a data asset is a set of datasets provided by a data source (e.g., a vendor). In some embodiments, releases (versions) of these data assets are set up as transactions on a dataset (e.g., version 1 of dataset 1 in data asset A is transaction Ion dataset 1, version 2 of dataset 1 in data asset A is transaction II on dataset 1). In certain embodiments, this means that in order to comply with data provider retention specifications, specific transactions on datasets need to be selectively deleted (e.g., by a data governance team). In some embodiments, these deletions need to propagate downstream to all children transactions (e.g., descendant datasets, child datasets) based on these transactions.

According certain embodiments, the data management system (e.g., a data retention/deletion system) is configured to tackle lineage-aware dataset transaction deletion. In some embodiments, the data management system (e.g., a data retention/deletion system) satisfies one or more of the following functional requirements: 1. view retention policies: For example, there are some user interface (UI) mechanisms to view retention policies on datasets; 2. inherit retention policies, for example, child datasets (e.g., descendant datasets, downstream datasets) should inherit retention policies from parent datasets (e.g., ancestor datasets, upstream datasets); 3. override retention policies for specific datasets, for example, there are some UI mechanisms to override the retention policy for a downstream dataset; 4. override retention date for a specific transaction, for example, there are some UI mechanism to change the retention date for a transaction; 5. inheritance of upstream transaction retention dates, for example, downstream transactions will be deleted at the same time as their upstream transaction parent, as long as their retention date isn't overridden. 6. understand what's to be deleted, for example, users should be able to (efficiently) get an overview of which transactions within a dataset will be deleted, and when.

According to some embodiments, retention compliance policies include: 1. fixed-deletion-date policy, for example, all new transactions under this policy will be deleted at time t; 2. time-to-live policy, for example, all new transactions under this policy will be deleted N days after they are created; 3. explicit-no-deletion policy, for example, all new transactions under this policy on a dataset will have no deletion date. In certain embodiments, the explicit-no-deletion policy is explicitly designed to exempt a specific dataset and its transactions from deletion requirements upstream.

According to certain embodiments, these retention policies can be configured at the dataset-level and concern datasets and their constituent transactions. In some embodiments, these retention policies could be expanded to be set at a project (e.g., including one or more datasets) or a namespace level (e.g., including one or more projects) as well. In certain embodiments, the data management system (e.g., a data retention/deletion system) is configured to perform evaluation of retention policies.

According to some embodiments, one of the key requirements of any deletion solution is legibility, including the ability to easily answer the question "what data will be deleted in the next N days". In certain embodiments, this question is not only important for various use cases, but is a pretty basic question that's useful in most large-data deletion systems. In some embodiments, the data management system (e.g., a data deletion/retention system) uses the immediate policy evaluation, for example, evaluate the policy whenever the transaction is created, or a policy is modified. In certain embodiments, the system implementing the immediate policy evaluation can result in a large amount of writes for older transactions, for example, if applied retroactively. In some embodiments, any edits to a retention policy are retroactively applied to one or more existing transactions (e.g., older transactions), for example, one or more existing transactions inheriting the retention policy. In some examples, the immediate policy evaluation can use a data repository structure (e.g., a disjoint-set data structure) to improve the efficiency of updating one or more retention dates. In certain examples, the immediate policy evaluation can be a potentially expensive operation.

In certain embodiments, the data management system (e.g., a data retention/deletion system) uses no retroactive application of retention policy changes, for example, any edits to a retention policy are only applied to future transactions. In some examples, all transactions that have already been written will maintain their retention dates.

According to some embodiments, the data management system (e.g., a data retention/deletion system) allows overriding retention dates for specific transactions. In certain examples, a specific transaction needs to be deleted immediately. In such examples, the data management system allows specific retention dates to be overridden by users with the appropriate privileges. In some examples, the override policy will supersede all dataset-level retention policies for that transaction.

According to certain embodiments, the data management system (e.g., a data retention/deletion system) allows overriding retention policies for specific datasets. In some embodiments, one or more datasets are transformed such that they may be deemed sufficiently safe and no longer require a restricted retention date. For example, the one or more datasets include only de-identified or aggregated data. In certain embodiments, to account for this, the system allows overriding/superseding a retention policy.

According to some embodiments, the data management system (e.g., a data retention/deletion system) uses a retention policy service including one or more key endpoints. FIG. 12 illustrates an example of one or more endpoints for a retention policy service. FIG. 12 is merely an example. One of ordinary skill in the art would recognize many variations, alternatives, and modifications.

According to certain embodiments, each transaction of one or more transactions is associated with a transaction retention date at the creation/commitment of the transaction. In some embodiments, the data management system stores deletion information about transactions (e.g., a transaction retention policy, a transaction retention date). In certain embodiments, the data management system uses a data repository structure, for example, representing a transaction retention record data object, to store transaction retention information and a transaction retention date. In some examples, the transaction retention record data object includes: Scheduled_Retention_Date for the transaction; Policy_IDs (and versions) that contributed to the aforementioned Scheduled_Retention_Date; Inheritable indicating whether or not this transaction should ever inherit its upstream retention date (e.g., true if the transform creating this transaction includes an InheritedRetentionInput); and an enumerator that describes how the retention date was derived. In certain examples, the enumerator includes one or more of the following values: POLICY_DERIVED_FROM_DATASET, which indicates that the retention date was derived from the Policy_IDs that were stored, OVERRIDDEN_UPSTREAM_TRANSACTION which indicates that an upstream transaction had its retention date overridden, and that was propagated down to this transaction, and OVERRIDDEN_HERE which indicates that the retention date was overridden here.

According to some embodiments, when a transaction is committed, the data management system will listen for these transaction commit events (e.g., using a listening infrastructure), and an entry will be populated for the new transaction.

According to certain embodiments, the data management system (e.g., a data retention/deletion system) performs execution of deletion. In some embodiments, the data management system (e.g., the data management framework), including the data deletion service, handles storing and propagating retention dates and policies. In certain embodiments, the data management system and/or the data deletion service periodically scans the deletion dates of transactions and marks the ones that need to be deleted. In certain examples, there is no provenance. In some examples, the system assigns and updates retention data, for example, based on an awareness of existing graph lineages, such that when it comes time to actually delete the data, no further traversal of any graphs is necessary. In certain embodiments, this service accepts the one or more retention dates that correspond to each transaction at face value.

According to certain embodiments, the data management system (e.g., a data retention/deletion system) executes the deletions according to the transaction retention record. In some embodiments, the data management system is configured to store and propagate retention dates and policies, and enforce the retention dates and actually delete the data. In certain examples, the data management system includes a retention enforcement service (e.g., RetentionEnforcementService) that periodically scans the deletion dates of transactions and refers them to a marking service (e.g., MarkService) for deletion. In some examples, the retention enforcement service accepts the retention dates that correspond to each transaction, for example, at face value, and calls the mark service when the time has come.

According to some embodiments, a retention enforcement service does not do a traversal of any graphs. In certain examples, the retention enforcement service includes one or more endpoints, for example, to provide visibility into what in the platform is to be deleted. In some examples, one or more endpoints will use a header (e.g., AuthHeader). FIG. 13 illustrates an example of one or more endpoints for a retention enforcement service. FIG. 13 is merely an example. One of ordinary skill in the art would recognize many variations, alternatives, and modifications.

Figure 14:
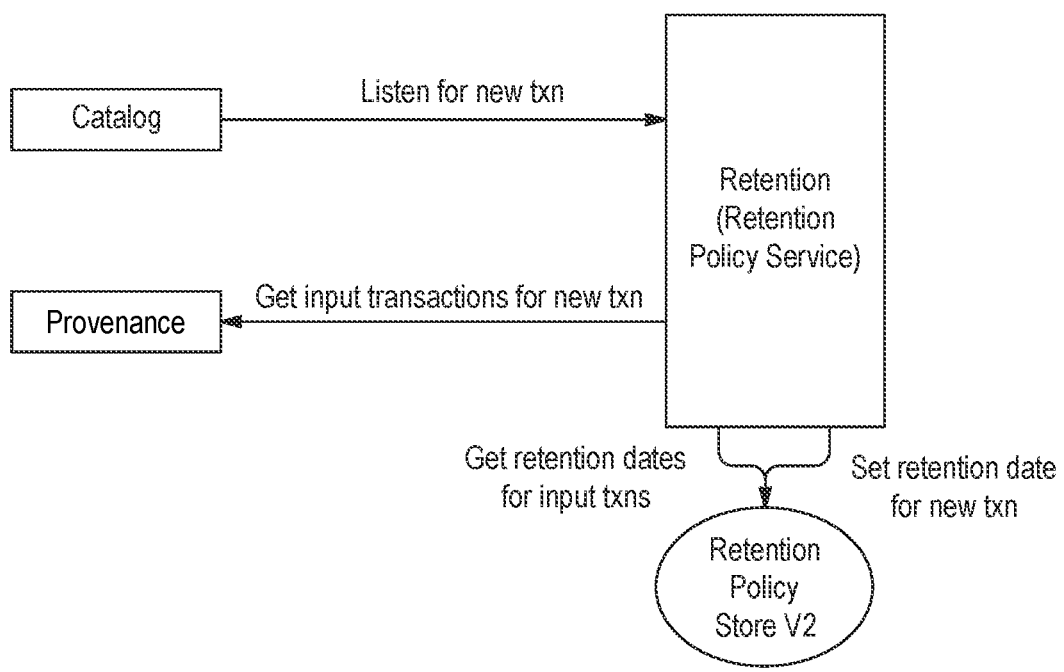
FIG. 14 illustrates an example flow diagram for a new transaction committed, according to some aspects described herein.
Figure 15:
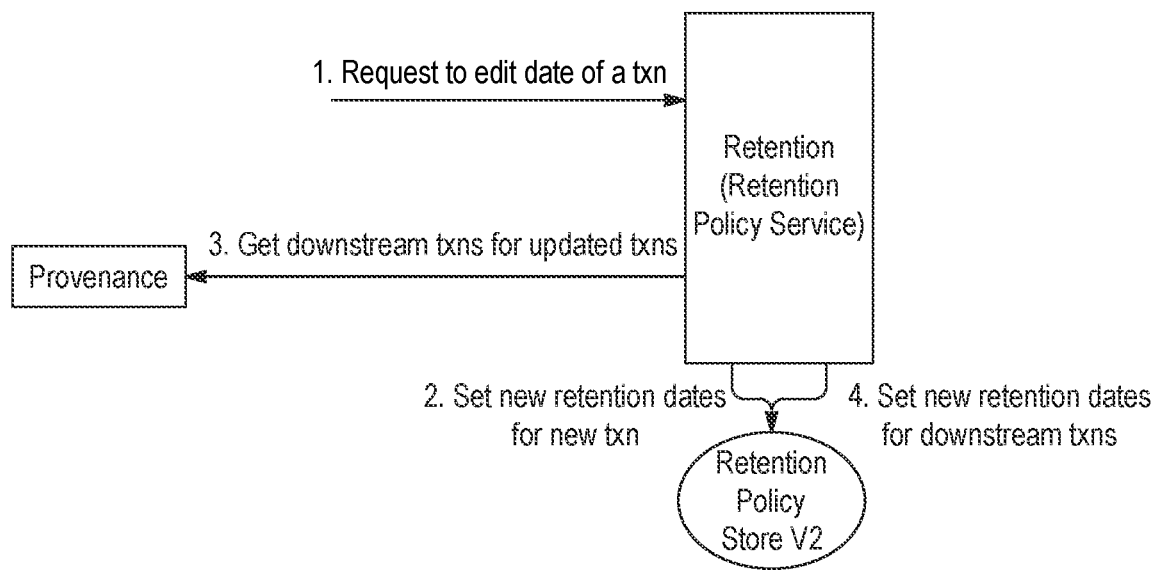
FIG. 15 illustrates an example flow diagram for a transaction retention date that is overridden, according to some aspects described herein.
Figure 16:
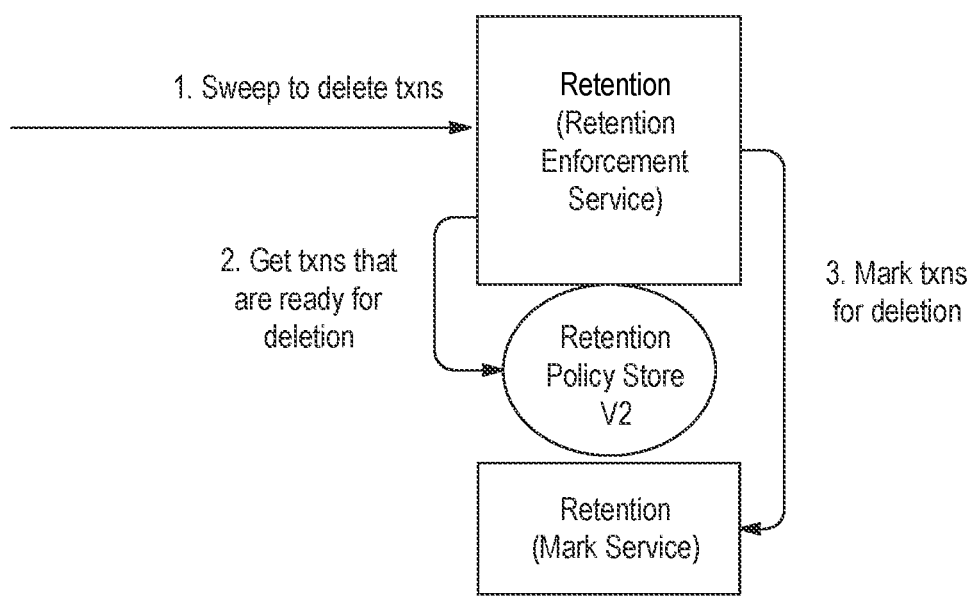
FIG. 16 illustrates an example flow diagram for a transaction deletion, according to some aspects described herein.

FIG. 14 illustrates an example flow diagram for a new transaction committed. FIG. 15 illustrates an example flow diagram for a transaction retention date that is overridden. FIG. 16 illustrates an example flow diagram for a transaction deletion. These figures are merely examples. One of ordinary skill in the art would recognize many variations, alternatives, and modifications.

According to certain embodiments, the data management system (e.g., a date retention/deletion system) could fail in conducting a retention sweep. In some embodiments, more retentions sweeps are re-tried and in some cases, the sweeps subsequently succeed, but in some cases (e.g., edge cases), these failures are persistent. In certain embodiments, in such situations, the data management system (e.g. a data retention/deletion system) will present this information to one or more users (e.g., pipeline administrators).

According to some embodiments, the data management system labels the transaction associated with a failed retention sweep with the failure. For example, instead of showing the retention date, the system can display that the transaction should have been deleted N days ago, but failed. In certain examples, this allows individuals who see the transaction to know that there was a failure.

According to certain embodiments, the data management system (e.g., a data retention/deletion system) can surface the one or more failed retention sweeps to one or more users (e.g., governance admins). In some examples, wherever the question "what is to be deleted in the next N days" is answered (e.g., on a dataset/project/namespace dashboard), the system should also be showing information about things that were meant to be swept, but failed persistently. In certain embodiments, the failed retention sweeps information can be stored and/or retrieved from a data repository (e.g., UnsweptMarkStore). In some examples, with this information, users can flag this to other system counterparts, and the system can investigate the root cause of the reason the transaction was not able to be deleted.

According to some embodiments, the data management system (e.g., a data retention/deletion system) can surface deletion time inconsistency. In certain embodiments, when the mark service (e.g., MarkService) marks a transaction for deletion, it could take some time for that deletion to actually be fully completed. For example, the system has to actually perform a sweep, which itself could take time. As an example, even when the transaction is marked (e.g., asking for the data to be deleted), it could take some time before the deletion is completed. In some examples, depending on the infrastructure, there could be more layers between marking for deletion and actually deleting. In certain embodiments, users are informed that their deletion date is really the start of the deletion process; it could take time (e.g., about 14 days) for the deletion to be completed (e.g., successful). In some embodiments, the deletion information is implemented as a simple tooltip on the deletion date explaining this, and informs the users configuring the dataset policies to account for this buffer when setting their policies.

According to certain embodiments, the data management system (e.g., a data retention/deletion system) manages one or more retention date override permissions. For example, the retention policy service validates a user's permissions before the user can override a retention policy on a transaction or a dataset. In some embodiments, in order to override a retention policy on a given transaction or dataset, the retention policy service can check that the user has an appropriate authentication (e.g., compass:manage) on one or more upstream datasets that the given transaction or dataset could derive its retention date from. For example, if a user has the appropriate authentication (e.g., compass:manage) on one or more datasets that specify retention policies upstream of the given dataset or transaction, the user can apply, via the system, an override for the downstream dataset or transaction.

Figure 17:
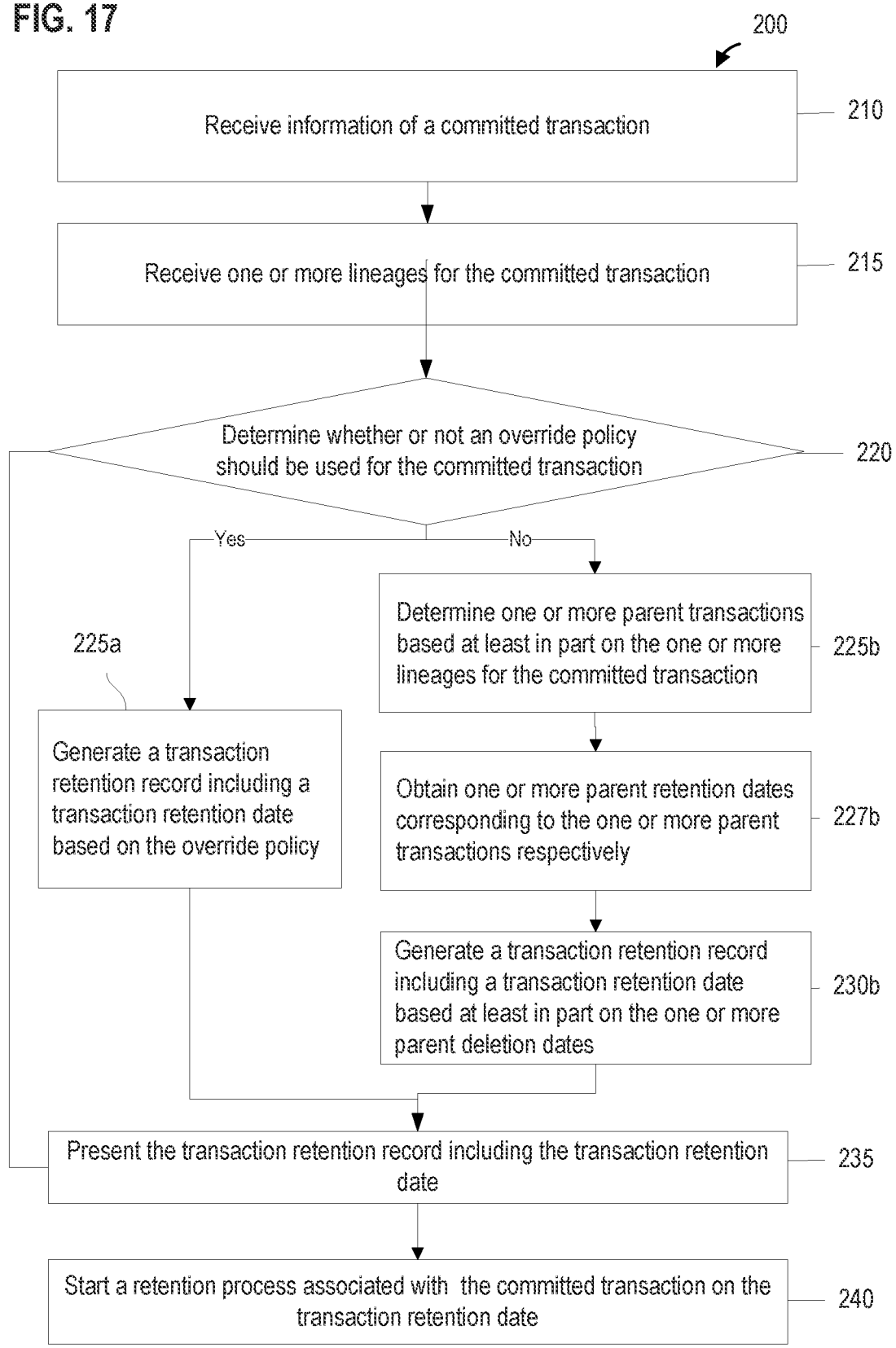
FIG. 17 illustrates an example method for linear-aware data retention, according to some aspects described herein.

FIG. 17 is a simplified diagram showing a method 200 for lineage-aware data retention according to certain embodiments of the present disclosure. This diagram is merely an example. One of ordinary skill in the art would recognize many variations, alternatives, and modifications. The method 200 for designing an application with action logs includes processes 210, 215, 220, 225a, 225b, 227b, 230b, 235, and 240. Although the above has been shown using a selected group of processes for the method 200 for designing an application with action logs, there can be many alternatives, modifications, and variations. For example, some of the processes may be expanded and/or combined. Other processes may be inserted into those noted above. Depending upon the embodiment, the sequence of processes may be interchanged with others replaced. Further details of these processes are found throughout the present disclosure.

According to some embodiments, at the process 210, the data management system (e.g., a data retention/deletion system) receives information of a committed transaction, where the committed transaction is configured to add or change data to a dataset. As used herein, "receiving" or "receives" means obtaining information from a software interface, user interface, inputs, and/or retrieving from a data repository. In certain embodiments, the committed transaction represents the added data or changed data (e.g., data of version 2) as a data subset in the dataset. In some embodiments, at the process 215, the data management system receives one or more lineages of the committed transaction. In certain embodiments, the one or more lineages include one or more upstream lineages indicating parent transactions for the committed transaction. In some embodiments, the one or more lineages include one or more downstream lineages indicating child transactions for the committed transaction. In certain embodiments, the one or more lineages represent parent-child relationship at the dataset level. In some embodiments, the one or more lineages represent parent-child relationship at the transaction level. In some embodiments, a transaction may be at the root of a lineage and therefore have no parent transactions (e.g., when the transaction is a raw dataset).

According to certain embodiments, at the process 220, the data management system determines whether or not an override policy should be used for the committed transaction. If yes, in some embodiments, at the process 225a, the data management system is configured to generate a transaction retention record including a transaction retention date based on the override policy. In certain embodiments, the transaction retention record includes the transaction retention date, one or more associated policy identifiers and/or information, one or more lineage information, an indication of inheritance status and/or information, an indication of override status and/or information, and/or the like. In some embodiments, the transaction retention record is the transaction retention date. In certain embodiments, the transaction retention record is associated with or integrated into the committed transaction or another data object associated with a committed transaction.

For example, referring back to FIG. 7, when transaction 2 of Dataset 2 is committed, the system checks whether there is an override policy, and as there is, set the transaction retention date for transaction 2 of Dataset 2 to be August 2 using 4-month TTL policy (e.g., commitment date+4 months), which overrides the 3-month TTL policy of Dataset 2's parent dataset (Dataset 1). For example, the transaction retention record of transaction 2 of Dataset 2 includes the transaction retention date of August 2, a policy identifier identifying the policy associated with Dataset 2, inheritance status being "not inherited", and override information indicating OVERRIDDEN_HERE.

If no override policy, according to some embodiments, at the process 225b, the system determines one or more parent transactions based at least in part on the one or more lineages for the committed transaction. In certain embodiments, at the process 227b, the system obtains one or more parent retention dates corresponding to the one or more parent transactions respectively. In some embodiments, at the process 230b, the system generates a transaction retention record including a transaction retention date based at least in part on the one or more parent deletion dates. In certain embodiments, the committed transaction has one parent transaction and the transaction retention date is set to the parent retention date of the parent transaction. In some embodiments, the committed transaction has two or more parent transactions and the transaction retention date is set to an earliest date of the corresponding two or more parent retention dates.

Referring back to FIG. 5, transaction 2 of Dataset 2 has one parent transaction (transaction 2 of Dataset 1). In this example, when transaction 2 of Dataset 3 is committed, the system determines the transaction retention date for transaction 2 of Dataset 2 is set to the parent retention date, July 2. Further, the transaction retention record for transaction 2 of Dataset 2 includes the transaction retention date of July 2, the policy identifier of Dataset 1, the inheritance status indicative of "inherited", and override status indicating "no override". Similarly, in one example, the transaction retention record for transaction 2 of Dataset 3 includes the transaction retention date of July 2, the policy identifier of Dataset 2, the inheritance status indicative of "inherited", and override status indicating "no override".

As an example illustrated in FIG. 7, transaction 2 of Dataset 3 has one parent transaction (transaction 2 of Dataset 2). In this example, when transaction 2 of Dataset 3 is committed, the system determines the transaction retention date for transaction 2 of Dataset 2 is set to the parent retention date, August 2. As an example, the transaction retention record for transaction 2 of Dataset 3 includes the transaction retention date of August 2, the policy identifier of Dataset 2, the inheritance status indicative of "inherited", and override status indicating OVERRIDDEN_HERE.

Referring back to FIG. 6, for example, when transaction 1 of Dataset 3 is committed, the system determines two associated parent transactions based on the lineages—transaction 1 of Dataset 1 and transaction 1 of Dataset 2. In one example, the system obtains two parent retention dates (July 1, July 3) corresponding to the two parent transactions respectively and determines the transaction retention date for transaction 1 of Dataset 3 to be the minimum (e.g. earliest) of the two parent retention dates (July 1, July 3), which is July 1. As an example, the transaction retention record for transaction 1 of Dataset 3 includes the transaction retention date of July 1, the policy identifier of Dataset 1, the inheritance information indicating "inherited", and override status indicating "no override".

As an example illustrated in FIG. 6, when transaction 2 of Dataset 3 is committed, the system determines two associated parent transactions based on the lineages—transaction 2 of Dataset 1 and transaction 2 of Dataset 2. In one example, the system obtains two parent retention dates (July 7, July 4) corresponding to the two parent transactions respectively and determines the transaction retention date for transaction 1 of Dataset 3 to be the minimum (e.g. earliest) of the two parent retention dates (July 7, July 4), which is July 4. As an example, the transaction retention record for transaction 2 of Dataset 3 includes the transaction retention date of July 4, the policy identifier of Dataset 2, the inheritance information indicating "inherited", and override status indicating "no override".

According to some embodiments, at the process 235, the system is configured to present the transaction retention record including the transaction retention date. In certain embodiments, at the process 240, the data management system starts a retention process associated with the committed transaction on the transaction retention date. In some embodiments, before the transaction retention date, the data management system iteratively checks, for example, going back to the process 220, whether there is an update associated with the transaction retention date for the committed transaction.

According to some embodiments, an indication corresponding to the transaction retention date for the committed transaction date may be displayed. For example, in some embodiments, an indication (e.g., audio and/or visual indication) may be provided to a user that indicates which committed transactions are going to be deleted in a specified number of days. In some embodiments, mechanisms provided herein may efficiently calculate retention dates throughout a lineage when a policy is assigned or updated, or when a new transaction is committed.

Further, according to some embodiments, a policy may be applied on a dataset for a specific transaction range. For example, instead of a policy applying to all transactions within a parent dataset, the policy may apply to a subset of transactions within the parent dataset, wherein that subset is specified explicitly in the policy. Accordingly, in some embodiments, descendant transactions of specific transactions in the parent dataset (e.g., transactions within the subset of transactions) have their retention dates impacted by the policy, and no other transactions have their retention dates impacted by the policy.

Figure 18:
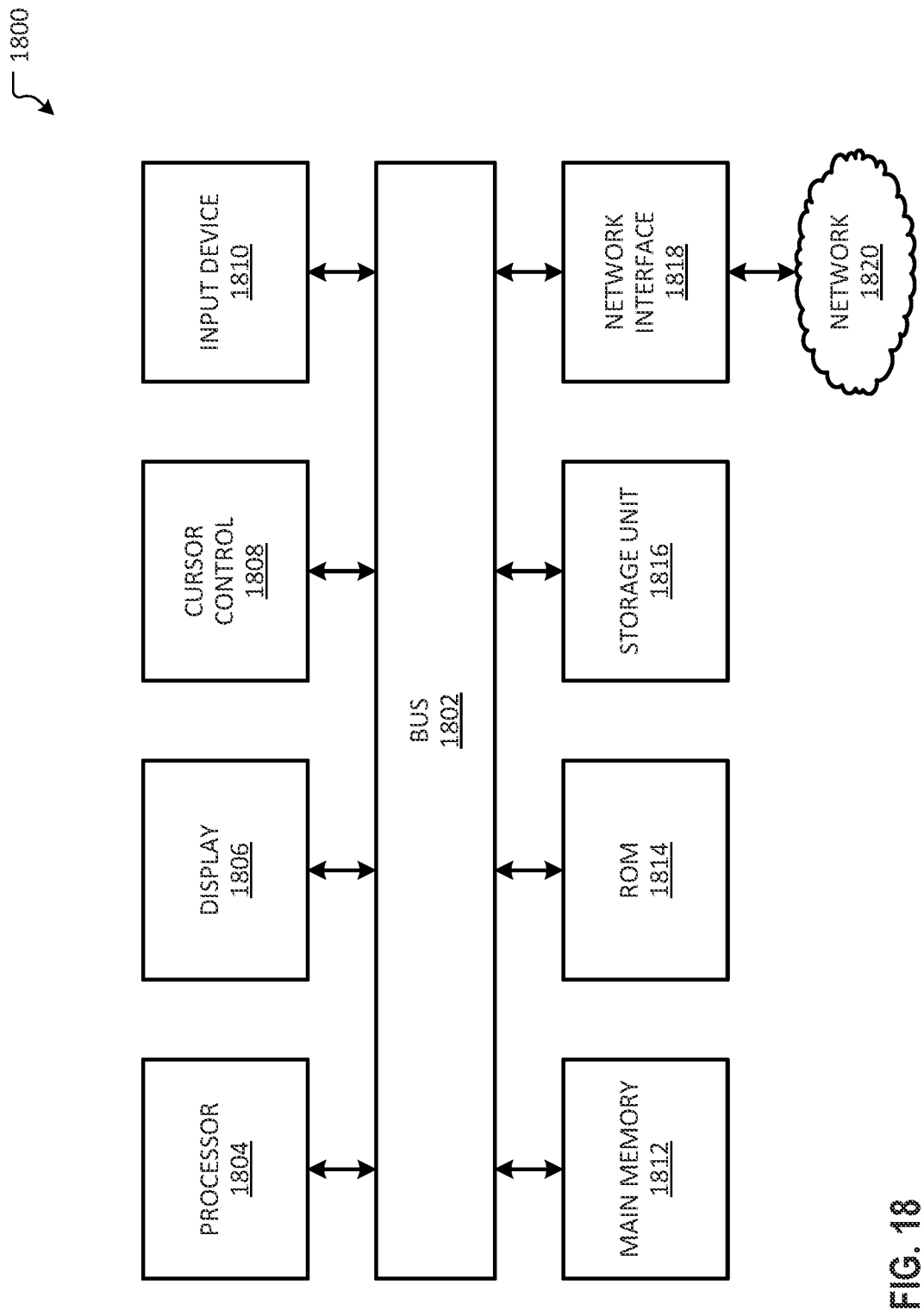
FIG. 18 illustrates an example diagram showing a computing system for implementing a system for linear-aware data retention, according to some aspects described herein.

FIG. 18 is a simplified diagram showing a computing system for implementing a system 1800 for linear-aware data retention in accordance with at least one example set forth in the disclosure. This diagram is merely an example, which should not unduly limit the scope of the claims. One of ordinary skill in the art would recognize many variations, alternatives, and modifications.

The computing system 1800 includes a bus 1802 or other communication mechanism for communicating information, a processor 1804, a display 1806, a cursor control component 1808, an input device 1810, a main memory 1812, a read only memory (ROM) 1814, a storage unit 1816, and a network interface 1818. In some embodiments, some or all processes (e.g., steps) of the method 1700 is performed by the computing system 1800. In some embodiments, the bus 1802 is coupled to the processor 1804, the display 1806, the cursor control component 1808, the input device 1810, the main memory 1812, the read only memory (ROM) 1814, the storage unit 1816, and/or the network interface 1818. In certain embodiments, the network interface is coupled to a network 1820. For example, the processor 1804 includes one or more general purpose microprocessors. In some embodiments, the main memory 1812 (e.g., random access memory (RAM), cache and/or other dynamic storage devices) is configured to store information and instructions to be executed by the processor 1804. In certain embodiments, the main memory 1812 is configured to store temporary variables or other intermediate information during execution of instructions to be executed by processor 1804. For example, the instructions, when stored in the storage unit 1816 accessible to processor 1804, render the computing system 1800 into a special-purpose machine that is customized to perform the operations specified in the instructions. In some embodiments, the ROM 1814 is configured to store static information and instructions for the processor 1804. In certain embodiments, the storage unit 1816 (e.g., a magnetic disk, optical disk, or flash drive) is configured to store information and instructions.

In some embodiments, the display 1806 (e.g., a cathode ray tube (CRT), an LCD display, or a touch screen) is configured to display information to a user of the computing system 1800. In some embodiments, the input device 1810 (e.g., alphanumeric and other keys) is configured to communicate information and commands to the processor 1804. For example, the cursor control component 1808 (e.g., a mouse, a trackball, or cursor direction keys) is configured to communicate additional information and commands (e.g., to control cursor movements on the display 1806) to the processor 1804.

According to certain embodiments, a method for lineage-aware data retention is provided. The method includes the steps of: receiving information of a committed transaction, the committed transaction configured to add or change data to a dataset; receiving one or more lineages for the committed transaction; determine one or more parent transactions based at least in part on the one or more lineages; obtaining one or more parent deletion dates corresponding to the one or more parent transactions respectively; and determining a transaction retention date for the committed transaction based at least in part on the one or more parent deletion dates. For example, the method is implemented according to at least FIG. 17.

Some embodiments further include receiving an override policy for data retention for the committed transaction, and updating the transaction retention date based on the override policy. In some embodiments, the receiving an override policy for data retention includes receiving a user permission of a user who enters or will enter the override policy, and validating the user permission of the user associated with the override policy. In some embodiments, the transaction retention date is set to the earliest date of the one or more parent deletion dates.

In some embodiments, each parent dataset of the one or more parent datasets is associated with a parent data retention policy, and the parent retention policy includes a corresponding parent retention date. Some embodiments, further include receiving an update to a first parent retention policy that is associated with a first parent dataset. The updated first parent retention policy includes an updated first parent retention date. Further, some embodiments further include updating the transaction retention date based at least in part on the updated first parent retention. Some embodiments further include triggering a process to update one or more child transactions associated with one or more child dates of the first parent dataset.

In some embodiments, the transaction retention date is associated with a retention policy. The retention policy is a time-to-live policy or a fixed-deletion-date policy. The time-to-live policy includes a predetermined amount of time for a first transaction to be deleted at a time after the specified amount of time has passed after the first transaction is created.

Some embodiments further include deleting the committed transaction according to the transaction retention date. Some embodiments further include displaying an indication that corresponds to the transaction retention date for the committed transaction.

In some embodiments, the one or more parent transactions are a plurality of parent transactions. The committed transaction is a plurality of committed transactions. Some embodiments further include receiving an override policy for data retention for a subset of parent transactions from the plurality of parent transactions, and updating the transaction retention date for a subset of committed transactions from the plurality of committed transactions based on the override policy. The subset of committed transactions correspond to the subset of parent transactions based on one or more of the one or more lineages.

According to certain embodiments, a system is provided. The system includes: at least one processor; and memory storing instructions that, when executed by the at least one processor, cause the system to perform a set of operations, the set of operations includes: receiving information of a committed transaction, the committed transaction configured to add or change data to a dataset; receiving one or more lineages for the committed transaction; determining one or more parent transactions based at least in part on the one or more lineages; obtaining one or more parent retention dates corresponding to the one or more parent transactions respectively; and determining a transaction retention date for the committed transaction based at least in part on the one or more parent retention dates. For example, the system is implemented according to at least FIG. 17.

In some embodiments, the set of operations further includes: receiving an override policy for data retention for the committed transaction; and updating the transaction retention date based on the override policy. In some embodiments, the receiving an override policy for data retention includes: receiving a user permission of a user who enters or will enter the override policy; and validating the user permission of the user associated with the override policy. In some embodiments, each parent dataset of the one or more parent datasets is associated with a parent data retention policy, and the parent data retention policy includes a corresponding parent retention date. In some embodiments, the set of operations further includes: receiving an update to a first parent retention policy associated with a first parent dataset, the updated first parent retention policy including an updated first parent retention date; and updating the transaction retention date based at least in part on the updated first parent retention. In some embodiments, the transaction retention date is associated with a retention policy, the retention policy is a time-to-live policy or a fixed-deletion-date policy, and the time-to-live policy includes a predetermined amount of time for a first transaction to be deleted at a time after the specified amount of time has passed after the first transaction is created. In some embodiments, the set of operations further includes deleting the committed transaction according to the transaction retention date. In some embodiments, the set of operations further includes displaying an indication corresponding to the transaction retention date for the committed transaction.

According to certain embodiments, a method for lineage-aware data retention is provided. The method includes: receiving information of a plurality of committed transactions, each committed transaction of the plurality of committed transactions configured to add or change data to a dataset; receiving one or more lineages for each committed transaction of the plurality of committed transactions; determining a plurality of parent transactions based at least in part on the one or more lineages for each committed transaction of the plurality of committed transactions; obtaining one or more parent retention dates corresponding to each parent transaction of the plurality of parent transactions; determining a transaction retention date for each committed transaction of the plurality of committed transactions based at least in part on the one or more parent retention dates; receiving an override policy for data retention for a subset of parent transactions from the plurality of parent transactions; and updating the transaction retention date for a subset of committed transactions from the plurality of committed transactions based on the override policy, the subset of committed transactions corresponding to the subset of parent transactions, wherein the method is implemented by one or more processors. For example, the method is implemented according to at least FIG. 17.

For example, some or all components of various embodiments of the present disclosure each are, individually and/or in combination with at least another component, implemented using one or more software components, one or more hardware components, and/or one or more combinations of software and hardware components. In another example, some or all components of various embodiments of the present disclosure each are, individually and/or in combination with at least another component, implemented in one or more circuits, such as one or more analog circuits and/or one or more digital circuits. In yet another example, while the embodiments described above refer to particular features, the scope of the present disclosure also includes embodiments having different combinations of features and embodiments that do not include all of the described features. In yet another example, various embodiments and/or examples of the present disclosure can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system (e.g., one or more components of the processing system) to perform the methods and operations described herein. Other implementations may also be used, however, such as firmware or even appropriately designed hardware configured to perform the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, EEPROM, Flash memory, flat files, databases, programming data structures, programming variables, IF-THEN (or similar type) statement constructs, application programming interface, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, DVD, etc.) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes a unit of code that performs a software operation and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present disclosure have been described, it will be understood by those of skill in the art that there are other embodiments that are equivalent to the described embodiments. Accordingly, it is to be understood that the invention is not to be limited by the specific illustrated embodiments. Various modifications and alterations of the disclosed embodiments will be apparent to those skilled in the art. The embodiments described herein are illustrative examples. The features of one disclosed example can also be applied to all other disclosed examples unless otherwise indicated. It should also be understood that all U.S. patents, patent application publications, and other patent and non-patent documents referred to herein are incorporated by reference, to the extent they do not contradict the foregoing disclosure.

What is claimed is:

1. A method for lineage-aware data retention, the method comprising:
    receiving information of a committed transaction, the committed transaction configured to add or change data to a dataset, and the committed transaction being derived from one or more parent transactions;
    receiving one or more lineages for the committed transaction;
    determining the one or more parent transactions based at least in part on the one or more lineages;
    obtaining one or more parent retention dates corresponding to the one or more parent transactions respectively;

assigning a transaction retention date to the committed transaction based at least in part on the one or more parent retention dates corresponding to the one or more parent transactions respectively from which the committed transaction is derived;

receiving an update to a parent retention policy associated with a parent dataset, the updated parent retention policy including an updated parent retention date;

updating the transaction retention date based at least in part on the updated parent retention policy; and triggering a process to update one or more child transactions associated with one or more child retention dates of the parent dataset, the one or more child transactions including the committed transaction derived from the one or more parent transactions, wherein the method is implemented by one or more processors.

2. The method of claim 1, further comprising:
receiving an override policy for data retention for the committed transaction; and
updating the transaction retention date based on the override policy.

3. The method of claim 2, wherein the receiving an override policy for data retention comprises:
receiving a user permission of a user who enters or will enter the override policy; and
validating the user permission of the user associated with the override policy.

4. The method of claim 1, wherein the transaction retention date is set to an earliest date of the one or more parent retention dates.

5. The method of claim 1, wherein each parent transaction of the one or more parent transactions is associated with a parent data retention policy, and wherein the parent data retention policy includes a corresponding parent retention date.

6. The method of claim 1, wherein the transaction retention date is associated with a retention policy, wherein the retention policy is a time-to-live policy or a fixed-deletion-date policy, and wherein the time-to-live policy includes a predetermined amount of time for a first transaction to be deleted at a time after the predetermined amount of time has passed after the first transaction is created.

7. The method of claim 1, further comprising:
deleting the committed transaction according to the transaction retention date.

8. The method of claim 1, further comprising:
displaying an indication corresponding to the transaction retention date for the committed transaction.

9. The method of claim 1, wherein the one or more parent transactions are a plurality of parent transactions, wherein the committed transaction is a plurality of committed transactions, and wherein the method further comprises:
receiving an override policy for data retention for a subset of parent transactions from the plurality of parent transactions; and
updating the transaction retention date for a subset of committed transactions from the plurality of committed transactions based on the override policy,
wherein the subset of committed transactions correspond to the subset of parent transactions based on one or more of the one or more lineages.

10. A system, the system comprising:
at least one processor; and
memory storing instructions that, when executed by the at least one processor, cause the system to perform a set of operations, the set of operations comprising:
receiving information of a committed transaction, the committed transaction configured to add or change data to a dataset, and the committed transaction being derived from one or more parent transactions;
receiving one or more lineages for the committed transaction;
determining the one or more parent transactions based at least in part on the one or more lineages;
obtaining one or more parent retention dates corresponding to the one or more parent transactions respectively;
assigning a transaction retention date to the committed transaction based at least in part on the one or more parent retention dates corresponding to the one or more parent transactions respectively from which the committed transaction is derived;
receiving an update to a parent retention policy associated with a parent dataset, the updated parent retention policy including an updated parent retention date;
updating the transaction retention date based at least in part on the updated parent retention policy; and
triggering a process to update one or more child transactions associated with one or more child retention dates of the parent dataset, the one or more child transactions including the committed transaction derived from the one or more parent transactions.

11. The system of claim 10, wherein the set of operations further comprises:
receiving an override policy for data retention for the committed transaction; and
updating the transaction retention date based on the override policy.

12. The system of claim 11, wherein the receiving an override policy for data retention comprises:
receiving a user permission of a user who enters or will enter the override policy; and
validating the user permission of the user associated with the override policy.

13. The system of claim 10, wherein each parent transaction of the one or more parent transactions is associated with a parent data retention policy, and wherein the parent data retention policy includes a corresponding parent retention date.

14. The system of claim 10, wherein the transaction retention date is associated with a retention policy, wherein the retention policy is a time-to-live policy or a fixed-deletion-date policy, and wherein the time-to-live policy includes a predetermined amount of time for a first transaction to be deleted at a time after the predetermined amount of time has passed after the first transaction is created.

15. The system of claim 10, wherein the set of operations further comprises:
deleting the committed transaction according to the transaction retention date.

16. The system of claim 10, wherein the set of operations further comprises:
displaying an indication corresponding to the transaction retention date for the committed transaction.

17. A method for lineage-aware data retention, the method comprising:
receiving information of a plurality of committed transactions, each committed transaction of the plurality of committed transactions configured to add or change data to a dataset, and each committed transaction of the plurality of committed transactions being derived from one or more parent transactions of a plurality of parent transactions;

receiving one or more lineages for each committed transaction of the plurality of committed transactions;

determining the plurality of parent transactions based at least in part on the one or more lineages for each committed transaction of the plurality of committed transactions;

obtaining one or more parent retention dates corresponding to each parent transaction of the plurality of parent transactions;

assigning a transaction retention date to each committed transaction of the plurality of committed transactions based at least in part on the one or more parent retention dates corresponding to the one or more parent transactions from which the respective committed transaction of the plurality of committed transactions is derived;

receiving an update to a parent retention policy associated with a parent dataset, the updated parent retention policy including an updated parent retention date;

updating at least one transaction retention date of the transaction retention dates assigned to the committed transactions based at least in part on the updated parent retention policy;

triggering a process to update one or more child transactions associated with one or more child retention dates of the parent dataset, the one or more child transactions including at least one committed transaction from the plurality of committed transactions;

receiving an override policy for data retention for a subset of parent transactions from the plurality of parent transactions; and updating the transaction retention date for a subset of committed transactions from the plurality of committed transactions based on the override policy, the subset of committed transactions corresponding to the subset of parent transactions, wherein the method is implemented by one or more processors.

18. The method of claim 17, wherein the receiving an override policy for data retention comprises:
    receiving a user permission of a user who enters or will enter the override policy; and
    validating the user permission of the user associated with the override policy.

19. The method of claim 17, wherein the transaction retention date is associated with the parent retention policy, wherein the parent retention policy is a time-to-live policy or a fixed-deletion-date policy.

20. The method of claim 19, wherein the parent retention policy is the time-to-live policy, and wherein the time-to-live policy includes a predetermined amount of time after which a transaction is created for which the transaction is to be deleted.

* * * * *